US011911982B2

(12) United States Patent
Pontone

(10) Patent No.: US 11,911,982 B2
(45) Date of Patent: Feb. 27, 2024

(54) METHOD AND SYSTEM FOR APPLYING A SEALING AGENT TO THE SURFACE OF AN INTERNAL CAVITY OF A PNEUMATIC TYRE

(71) Applicant: Bridgestone Europe NV/SA, Zavenlem (BE)

(72) Inventor: Roberto Pontone, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 719 days.

(21) Appl. No.: 16/764,138

(22) PCT Filed: Dec. 18, 2018

(86) PCT No.: PCT/IB2018/060285
§ 371 (c)(1),
(2) Date: May 14, 2020

(87) PCT Pub. No.: WO2019/123275
PCT Pub. Date: Jun. 27, 2019

(65) Prior Publication Data
US 2020/0391456 A1    Dec. 17, 2020

(30) Foreign Application Priority Data
Dec. 20, 2017 (IT) .......................... 102017000147528

(51) Int. Cl.
*B29D 30/06* (2006.01)
*B29C 73/22* (2006.01)

(52) U.S. Cl.
CPC .......... *B29C 73/22* (2013.01); *B29D 30/0685* (2013.01); *B29D 2030/0694* (2013.01)

(58) Field of Classification Search
CPC ........ B29D 30/0685; B29D 2030/0686; B29D 2030/0694; B29D 2030/0695; B29D 2030/0697
See application file for complete search history.

(56) References Cited

U.S. PATENT DOCUMENTS 5,942,059 A * 8/1999 Wulker ................. B29D 30/60
118/712

FOREIGN PATENT DOCUMENTS

| CN | 1531464 A | 9/2004 |
| CN | 103990571 A | 8/2014 |

(Continued)

OTHER PUBLICATIONS

CN103990571A—Machine Translation.
CN1531464A—Machine Translation.

*Primary Examiner* — Geoffrey L Knable

(57) ABSTRACT

A system (1) for applying a sealing agent to the surface (5) of an internal cavity (2) of a pneumatic tyre (3) provided with an applicator device (12) for supplying a strip of sealing agent that is applied to the surface (5) and an opto-electronic device (4*; 20) that is integral to the nozzle (18) of the applicator device (12) and that is provided with at least one sensor element (9*; 20) that is able to acquire a plurality of images of the surface (5) and to provide a plurality of signals that are indicative of said plurality of acquired images; and an electronic processing system (11) connected to the opto-electronic device (4*; 20), and to the applicator device (12) and configured so as to acquire the signals that are indicative of the plurality of images acquired by the opto-electronic device (4*; 20); and to control the application of the sealing agent as a function of the plurality of signals that are indicative of the plurality of images acquired by the opto-electronic device (4*; 20).

9 Claims, 5 Drawing Sheets

(56) References Cited

FOREIGN PATENT DOCUMENTS

JP     2016080695 A   *  5/2016
WO   WO-2019/123201 A1  *  6/2019  ......... B29D 30/0685

* cited by examiner

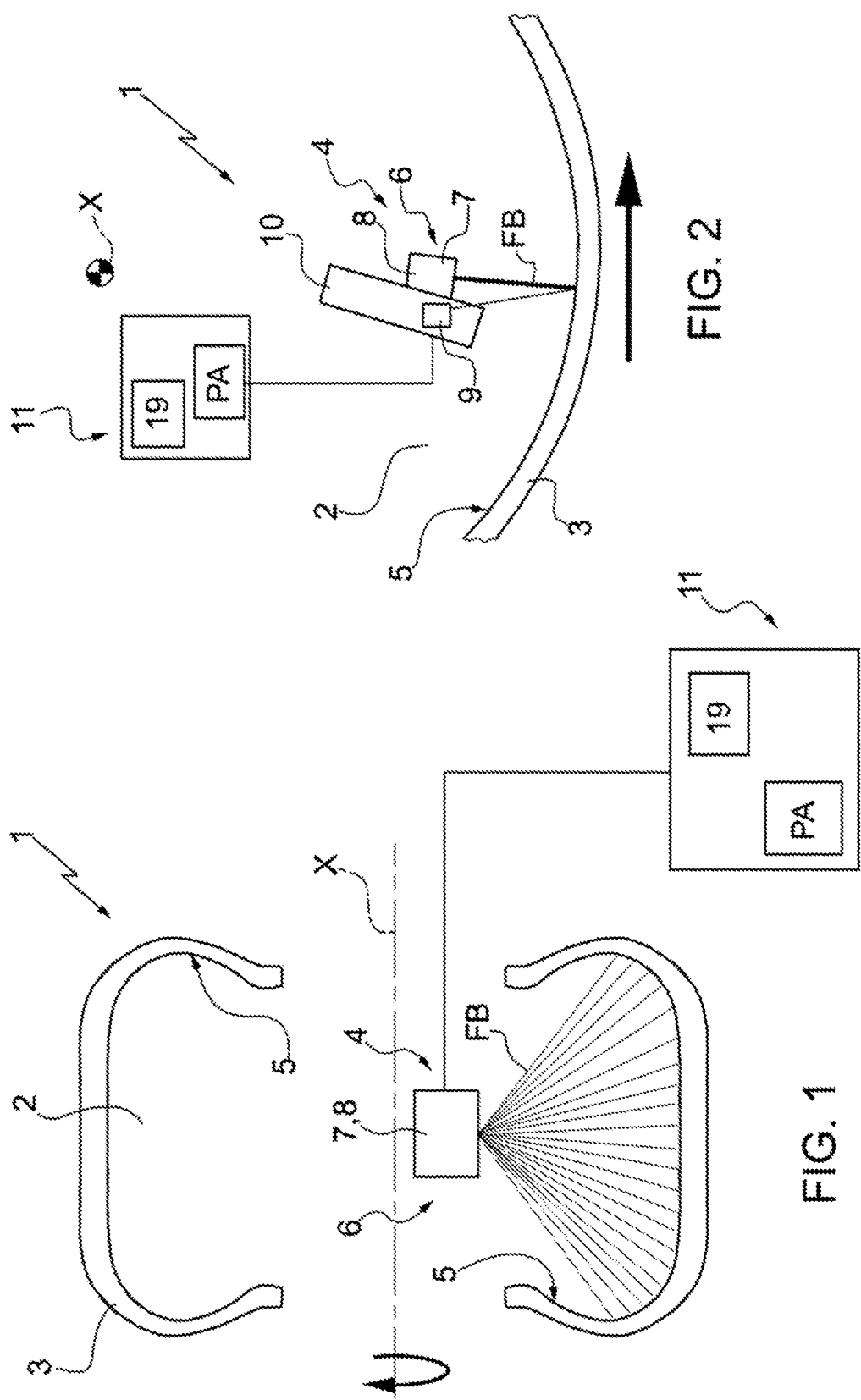

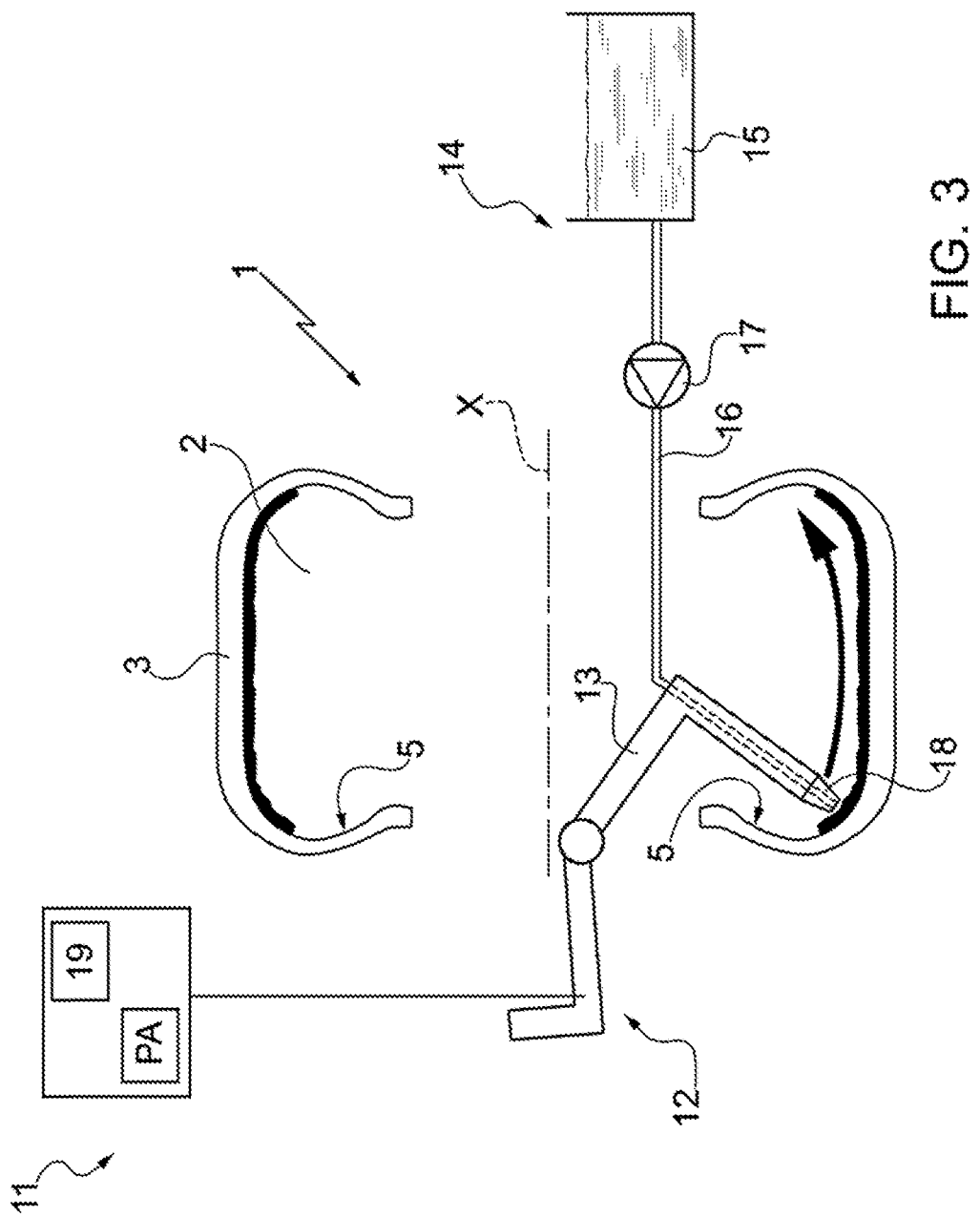

| Deg. | Point #1 | | | Point #2 | | | Point #3 | | | Point #n | | |
|---|---|---|---|---|---|---|---|---|---|---|---|---|
| | X | Y | Z | X | Y | Z | X | Y | Z | X | Y | Z |
| 0 | 85.6 | 57.8 | 45.4 | 85.2 | 56.9 | 45.2 | 85.2 | 56.9 | 45.2 | 85.2 | 56.9 | 45.2 |
| 1 | 85.2 | 56.9 | 45.2 | 85.6 | 57.8 | 45.4 | 85.6 | 57.8 | 45.4 | 85.6 | 57.8 | 45.4 |
| 2 | 85.6 | 57.8 | 45.4 | 85.2 | 56.9 | 45.2 | 85.2 | 56.9 | 45.2 | 85.6 | 57.8 | 45.4 |
| ⇒ | | | | | | | | | | | | |
| 359 | 85.2 | 56.9 | 45.2 | 85.2 | 56.9 | 45.2 | 85.2 | 56.9 | 45.2 | 85.6 | 57.8 | 45.4 |

FIG. 4

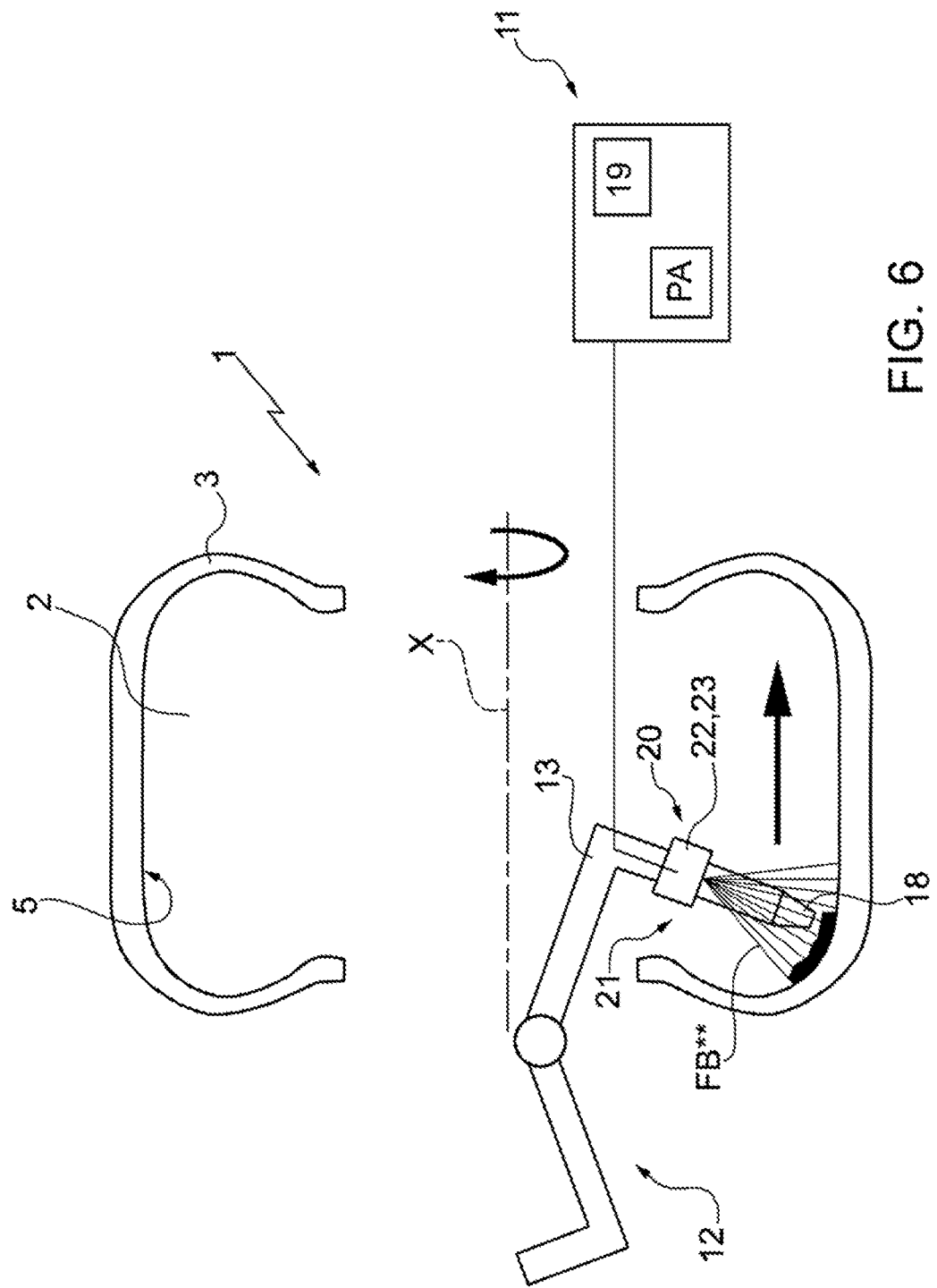

METHOD AND SYSTEM FOR APPLYING A SEALING AGENT TO THE SURFACE OF AN INTERNAL CAVITY OF A PNEUMATIC TYRE

This application is a national stage application of PCT/IB2018/060285 filed on Dec. 18, 2018, which claims priority to Italian Application Serial No. 102017000147528 filed on Dec. 20, 2017, which are incorporated herein by reference in their entirety.

TECHNICAL SECTOR

The present invention relates to a method and a system for applying a sealing agent to the surface of an internal cavity of a pneumatic tyre.

PRIOR ART

As it is known, a pneumatic tyre comprises a toroidal carcass, which has two annular beads and which supports an annular tread. A tread is interposed between the carcass and the tread which comprises a number of tread plies. The carcass then supports a pair of sidewalls arranged between the tread and the beads. An innerliner is arranged within the carcass ply which is impermeable to air, constitutes an inner lining and has the function of retaining the air within the pneumatic tyre in order to maintain the inflation pressure of the pneumatic tyre itself over time.

In recent years pneumatic tyre development has been directed towards pneumatic tyres with an inner lining that is manufactured with a sealing agent that is intended to seal any punctures. Typically, the sealing agent has a high viscosity in order to ensure both the sealing action in relation to any holes and the stability thereof within the internal cavity regardless of the conditions of the pneumatic tyre.

The sealing agent is applied to a pre-vulcanized pneumatic tyre and preferably to the innerliner within the area of the pneumatic tyre that comes into contact with the road (or the area of the pneumatic tyre wherein punctures can potentially occur). In particular, the sealing agent is applied at the tread and at least partially at the sidewalls.

Typically the procedure for applying the sealing agent provides for the positioning of the pre-vulcanized pneumatic tyre on a support wherein it is blocked by means of lateral rails in such a way as to prevent any lateral translation of the pneumatic tyre itself.

In response to an operator command, the sealing agent application process is started by inserting a sealing agent applicator device into the internal cavity of the pneumatic tyre in a position directly facing a surface of the internal cavity itself. The applicator device is conveniently implemented by means of a movable arm provided at one end of a nozzle and is intended to apply a substantially uniform bead of sealing agent to the inner surface of the cavity. In particular, the applicator device is intended to apply a bead of sealing agent by means of a reciprocating movement between the two lateral ends of the internal cavity; in particular, the arm moves within a plane that is perpendicular to the equatorial plane of the pneumatic tyre. The pneumatic tyre is brought into rotation by the support by means of motorized rollers; the movement (continuous or else alternatively stepped) of the arm and the rotation of the pneumatic tyre leads to the application of the sealing agent. Advantageously in the case of a continuous movement of the arm, the application of the sealing agent follows a helical progression.

The coordinates of the sealing agent application points are determined as a function of the dimensions of a reference pneumatic tyre (i.e. of a "nominal" pneumatic tyre); in other words, the arm of the applicator device moves within the cavity according to the coordinates of the application points of the reference pneumatic tyre and not the actual coordinates of the pneumatic tyre being processed.

It has been observed that known and currently used application systems do not make it possible to obtain elevated uniformity in regard to the thickness of the sealing agent that is applied to the surface of the internal cavity, i.e., the thickness of the sealing agent that is applied to the surface of the internal cavity can have appreciable variations from area to area. Consequently, in order to ensure that in every area of the surface of the internal cavity there is an adequate thickness (i.e., not less than a predetermined minimum threshold) it is necessary to apply an elevated average thickness (i.e. disproportionate) with a consequent increase in the cost and weight of the pneumatic tyre (insofar as it is necessary to use a greater amount of sealing agent for each pneumatic tyre). Furthermore, an uneven application of the sealing agent may also lead to an imbalance (i.e. eccentricity) in the overall mass of the pneumatic tyre.

DESCRIPTION OF THE INVENTION

The object of the present invention is therefore to provide a system for applying a sealing agent to the surface of an internal cavity of a pneumatic tyre that is free from the disadvantages of the state of the art and that is, in particular, easy and inexpensive to manufacture.

A further object of the present invention is to provide a method for applying a sealing agent to the surface of an internal cavity of a pneumatic tyre that is free from the disadvantages of the state of the art and that is, in particular, easy and inexpensive to implement.

According to the present invention a method and a system are provided for applying a sealing agent to the surface of an internal cavity of a pneumatic tyre according to what is determined within the attached claims.

BRIEF DESCRIPTION OF THE DRAWINGS

The present invention is now described in reference to the attached drawings, which illustrate several non-limiting exemplary embodiments, wherein:

FIG. 1 is a schematic view, with parts removed for clarity, of a first variant of a system that has been implemented according to the present invention, in order to determine the profile of the internal cavity of a pneumatic tyre;

FIG. 2 is a side view of a detail of FIG. 1;

FIG. 3 is a schematic view, with parts removed for clarity, of a first variant of a system that has been implemented according to the present invention, for the application of a sealing agent to the surface of the internal cavity of a pneumatic tyre;

FIG. 4 schematically illustrates the x, y and z reference coordinates of a plurality of points for each of the portions into which the surface of the internal cavity of a pneumatic tyre is divided;

FIG. 6 is an additional schematic view and with parts removed for clarity of the system of FIG. 5.

PREFERRED EMBODIMENTS OF THE INVENTION

Figure 5:
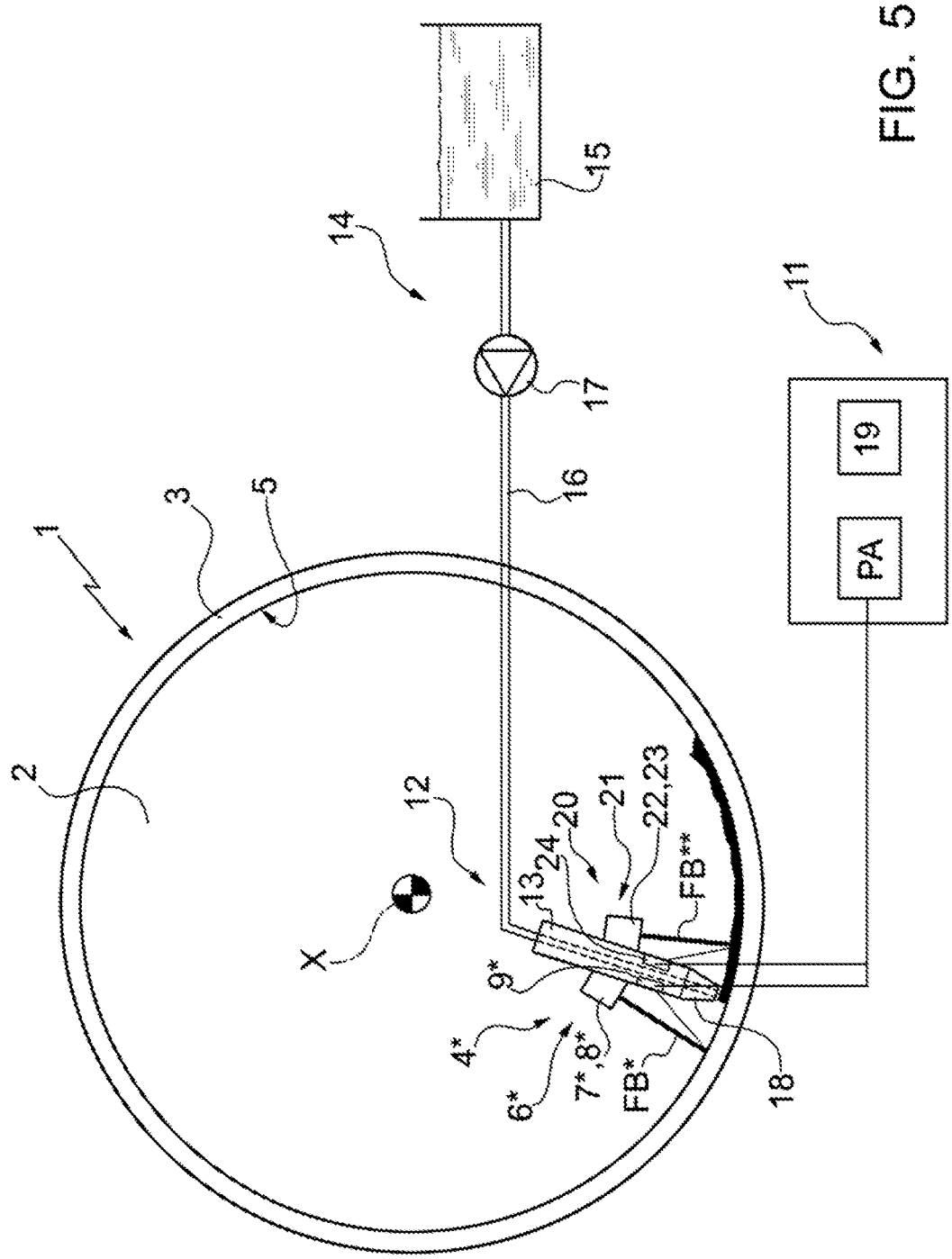
FIG. 5 is a schematic view, with parts removed for clarity, of a second variant of a system that has been implemented according to the present invention, in order to determine the profile of the internal cavity of a pneumatic tyre and for the application of a sealing agent to the surface of said cavity.

With reference to FIG. 1, the number 1 denotes as a whole a system 1 configured in such a way as to determine the profile of the internal cavity 2 of a pneumatic tyre 3 and, subsequently, for the application of a sealing agent to the surface 5 of said internal cavity 2. It is to be understood that "profile of the internal cavity 2 of a pneumatic tyre 3" refers to a surface profile of the pneumatic tyre 3.

The pneumatic tyre 3 is arranged on a frame (not shown) that is suitable for supporting, and bringing into rotation around the X-axis thereof, the pneumatic tyre 3 by means of motorized rollers. The frame is made to bring pneumatic tyres 3 into rotation at a substantially constant speed and preferably between 1 and 15 m/min. Preferably, the pneumatic tyre 3 is housed within the frame in such a way as to prevent any lateral translation of the pneumatic tyre 3 itself during the rotational movement around the X-axis. The system 1 is provided with an optoelectronic device 4, which is configured in such a way as to emit at least one light beam LB along a direction of emission. The optoelectronic device 4 is furthermore configured in such a way as to capture, or acquire (or detect) an image containing the line of light projected onto the surface 5 of the internal cavity 2.

The optoelectronic device 4 comprises an optical profilometer 6. The optical profilometer 6 in turn comprises an emitting device 7 that impacts the surface 5 so to project a line of light onto the surface 5 itself. The light beam LB is collimated onto a plane so that it is laminar and divergent, in such a way as to form a spectrum of light that traces the line of light over the affected surface 5. According to a preferred variant, the spectrum of light strikes a portion of the surface 5 that substantially corresponds to the cross-section of the surface 5 to which the sealing agent is to be subsequently applied. The light emitting device 7 comprises a source 8 of laser light.

The optical profilometer 6 furthermore comprises a sensor element 9 configured in such a way as to acquire/capture the image contained within the line of light projected onto the affected surface 5 and to supply a signal that is indicative of the captured image. Conveniently, the sensor element 9 can comprise an image acquisition device, for example a microcamera.

According to what is shown in FIG. 2, the system 1 furthermore comprises an external enclosure 10, which is made in such a way as to house the optoelectronic device 4. The external enclosure 10 is made to be movable in such a way as to be arranged within the internal cavity 2 directly facing the surface 5. In the detection position the external enclosure 10 is directly facing the internal cavity 2, substantially at the center of the circumference defined by an equatorial plane of the pneumatic tyre 3

Conveniently, the sensor element 9 can be integrated into the external enclosure 10 in such a way that the photosensitive surface thereof may be arranged, in the detection position, directly facing the internal cavity 2.

The system 1 furthermore comprises an electronic processing system 11 that is configured in such a way as to receive signals from the sensor element 9 that are indicative of the captured images. The electronic processing system 11 is configured so as to process the signals that are indicative of captured images in order to determine the profile of the internal cavity 2 according to the lines of light contained within each image. Conveniently, the electronic processing system 11 is configured in such a way as to determine the profile of the internal cavity 2 in implementing a PA algorithm that digitally processes the captured images.

The automatic movement of the frame that supports and carries the pneumatic tyre 3 through a rotation of 360° around the X axis (whilst the external enclosure 10 is stationary) allows the electronic processing system 11 to perform a surface scan of a number of portions of the surface 5 that are uniformly distributed around the X-axis and in a number, for example, equal to 360 (i.e., one for each degree of rotation around the X axis).

Advantageously, the electronic processing system 11 is configured in such a way as to perform, for each portion of the surface 5, an x, y and z three dimensional scan for a plurality of points into which each portion is divided. The maximum measurable dimensions are in the order of one millimeter.

According to what is shown in FIG. 4, the electronic processing system 11 is configured in such a way as to perform the three dimensional scan of the surface 5 in such a way as to identify the x, y, and z reference coordinates of a plurality of points (indicated with Point #1, Point #2, . . . Point #) for 360 portions (indicated with Deg. From 0 to 359) of said surface 5.

As shown in FIG. 3, the system 1 furthermore comprises a sealing agent applicator device 12 which is conveniently implemented by means of a robot with an arm 13 that is movable and intended to apply a substantially uniform bead of sealing agent to the surface 5. According to a preferred embodiment, the arm 13 does not coincide with the external enclosure 10 made to house the optoelectronic device 4. According to a second variant, the sealing agent applicator device 12 and the optoelectronic device 4 may be housed within a common enclosure.

The applicator device 12 is intended to apply a bead of sealing agent by means of a reciprocating movement between the two lateral ends of the internal cavity 2; in particular, the arm 13 moves in a plane that is perpendicular to the equatorial plane of the pneumatic tyre 3. The rotation of the frame around the x-axis and the movement of the arm 13 leads to an application with a helical progression. More specifically, the applicator device 12 is intended to apply a bead of sealing agent at the portion of the pneumatic tyre 3 that is intended to come into contact with the road, i.e., at the tread strip and, at least partially, at the sidewalls.

The applicator device 12 is connected to a circuit 14 supplying the sealing agent comprising a tank 15, preferably manufactured from a metallic material and containing the sealing agent, a conduit 16 that is preferably heated and that originates from the tank 15 and that is in hydraulic communication with the applicator device 12, and a pumping device 17 that draws the sealing agent from the tank and feeds it under pressure to the applicator device 12.

According to a preferred variant, the applicator device is implemented by means of a nozzle 18 in order to perform the non-contact application of the sealing agent in the semifluid state; the nozzle 18 is preferably arranged at one axial end of the movable arm 13.

Once the three dimensional scan has been performed for each portion of the surface 5 and the profile of the internal cavity 2 has been acquired, the electronic processing system 11 is able to calculate the movement of the nozzle 18 in applying the sealing agent as a function of said profile.

The electronic processing system 11 is in fact configured in such a way as to drive the arm 13 as a function of the acquired profile of the internal cavity 2. In particular, the electronic processing system 11 is configured in such a way as to drive the arm 13 so as to vary the distance of the nozzle 18 from the surface 5 and hold the distance between the nozzle 18 and the surface 5 substantially constant. It should be emphasized that by holding the distance between the nozzle 18 and the surface 5 substantially constant it is possible to implement a more uniform application in terms of the thickness and width of the bead and in terms of the precision of the sealing agent application area.

Conveniently, the electronic processing system 11 may comprise an operator interface 19, such as a control panel and/or a display or similar, by means of which the operator can control the internal cavity 2 profile scanning process and the application of the sealing agent.

Hereinafter there will be described the method of operation of the system 1, which includes, in succession, the following steps:

- an operator or alternatively an automatic manipulator arranges the pneumatic tyre 3 on the support and blocks it by means of side rails in such a way as to prevent any lateral translation of the pneumatic tyre 3 itself;
- in response to an operator command given through, for example, the operator interface 19, the opto-electronic device 4 is arranged in the detection position it being inserted within the internal cavity 2;
- whilst the pneumatic tyre 3 is brought into rotation around the x-axis by means of the frame, the detection of the internal cavity 2 profile begins; by means of the emitter device 7 the opto-electronic device 4 emits the light beam LB so as to project the line of light onto the surface 5 and to collect, by means of the sensor element 9, for each of the 360 portions of the surface 5, the reflected images containing the projected line of light;
- the opto-electronic device 4 transfers the acquired images in digital format, in the form of data or else encoded as electrical signals, to the electronic processing system 11;
- at the end of the internal cavity 2 profile detection step (when the pneumatic tyre 3 has completed a rotation of 360°), the support is stopped so that the opto-electronic device 4 may be extracted from the internal cavity 2;
- the electronic processing system 11, by means of the PA algorithm that digitally processes the captured images, performs a three dimensional scan of the internal cavity 2 and determines the reference coordinates of the sealing agent application points of the application device 12 for each portion of the surface 5 as a function of said scan;
- the applicator device 12 is inserted into the internal cavity 2;
- the nozzle 18 is moved to an initial position in order to being the application of the sealing agent;
- the pneumatic tyre 3 is brought into rotation around the x-axis by the frame whilst the nozzle 18 begins the application of the sealing agent;
- during the rotation of the pneumatic tyre 3 around the axis X, the nozzle 18 moves, following the reference coordinates of the sealing agent application points in such a way as to hold the distance between the nozzle 18 and the surface 5 substantially constant, and to render a substantially uniform application to the surface 5; as a function of the movement of the applicator device 12 (continuous or else alternatively stepped), the application of the sealing agent may or may not have a helical progression;
- at the end of the step of applying the sealing agent to the surface (when the pneumatic tyre 3 has completed a series of 360° rotations in order to obtain the helical progression of the sealing agent), the support is arrested in such a way that the applicator device 12 comes out from the internal cavity 2 and the pneumatic tyre 3 can be extracted from the support.

According to a preferred embodiment, the electronic processing system 11 is configured in such a way as to determine, at the end of internal cavity 2 profile detection step, the normalized average profile of the portions of the surface 5 as a function of the three-dimensional scan performed for the entirety of the internal cavity 2. During the rotation of the pneumatic tyre 3, the nozzle 18 moves, following the average profile of the sections in order to perform the application of the sealing agent.

Shown as a whole in FIGS. 5 and 6 is a second embodiment of the system 1 configured in order to determine the profile of the internal cavity 2 of the pneumatic tyre 3, and subsequently, the application of a sealing agent to the surface 5 of said internal cavity 2, as a comparison to the system shown in FIGS. 1 to 4 and the corresponding parts are color coded, wherever possible, with the same reference numbers.

The pneumatic tyre 3 is installed on a frame (not shown) that is able to support and bring into rotation around the X-axis thereof, the pneumatic tyre 3 by means of motorized rollers. The frame is made to bring pneumatic tyres 3 into rotation at a substantially constant speed and preferably between 1 and 15 m/min. Preferably, the pneumatic tyre 3 is housed within the frame in such a way as to prevent any lateral translation of the pneumatic tyre 3 itself during the rotational movement around the x-axis.

The system 1 furthermore comprises a sealing agent applicator device 12 which is conveniently implemented by means of a robot with an arm 13 that is movable and intended to apply a substantially uniform bead of sealing agent to the surface 5. In particular, the applicator device 12 is intended to apply a bead of sealing agent by means of a reciprocating movement between the two lateral ends of the internal cavity 2; in particular, the arm 13 moves in a plane that is perpendicular to the equatorial plane of the pneumatic tyre 3.

The rotation of the frame around the X-axis and the movement of the arm 13 (continuous or else alternatively stepped) lead to the application of the sealing agent which may (in the case of a continuous movement) or may not (in the case of a stepped movement) have a helical progression. More specifically, the applicator device 12 is intended to apply a bead of sealing agent at the portion of the pneumatic tyre 3 that is intended to come into contact with the road, i.e., at the tread strip and, at least partially, at the sidewalls. The applicator device 12 is connected to a circuit 14 supplying the sealing agent comprising a tank 15, preferably manufactured from a metallic material and containing the sealing agent, a conduit 16 that is preferably heated and that originates from the tank 15 and that is in hydraulic communication with the applicator device 12, and a pumping device 17 that draws the sealing agent from the tank 15 and feeds it under pressure to the applicator device 12.

According to a preferred variant, the applicator device 12 is implemented by means of a nozzle 18 in order to perform the non-contact application of the sealing agent in the semifluid state; the nozzle 18 is preferably arranged at one axial end of the movable arm 13.

The system 1 is further provided with an opto-electronic device 4\*, which is housed within the movable arm 13 and which is configured in such a way as to emit at least one light beam LB* along an emission direction.

The optoelectronic device 4* is furthermore configured in such a way as to capture, or acquire (or detect) an image containing the line of light projected onto the surface 5 of the internal cavity 2. In relation to the direction of rotation of the pneumatic tyre 3, the opto-electronic device 4 is arranged immediately upstream of the nozzle 18; in other words, the opto-electronic device 4* is arranged in relation to the nozzle 18 so that each portion of the surface 5 to be coated with the sealing agent is first impacted by the light beam LB* emitted by the opto-electronic device 4* and then by the bead of sealing agent emitted from the nozzle 18.

The opto-electronic device 4* comprises an optical profilometer 6*. The optical profilometer 6* comprises a light emitting device 7* so as to emit/generate the light beam LB. The light beam LB is collimated onto a plane so that it is laminar and divergent, in such a way as to form a spectrum of light that traces a line of light over the affected surface 5. According to a preferred variant, the spectrum of light impacts a portion of the surface 5 to which the sealing agent is to be subsequently applied. It is beneficial to point out that the light beam LB impacts upon only a portion of the cross-section of the surface 5 upon which the sealing agent is to be applied.

The light emitting device 7* comprises a source 8* of laser light.

The optical profilometer 6* furthermore comprises a sensor element 9* configured in such a way as to acquire/capture the image contained within the line of light projected onto the impacted surface 5 and to supply a signal that is indicative of the captured image. Conveniently, the sensor element 9* can comprise an image acquisition device, for example a micro-camera.

The system 1 is further equipped with a further optoelectronic device 20, which is housed within the movable arm 13 and which is configured in such a way as to emit at least one light beam LB* along an emission direction. The optoelectronic device 20 is furthermore configured in such a way as to capture, or acquire (or detect) an image containing the line of light projected onto the surface 5 of the internal cavity 2. In relation to the direction of rotation of the pneumatic tyre 3, the opto-electronic device 20 is arranged immediately downstream of the nozzle 18; in other words, the opto-electronic device 20 is arranged in relation to the nozzle 18 so that each portion of the surface 5 to be coated with the sealing agent is first impacted by the bead of sealing agent emitted from the nozzle 18 and then by the light beam LB* emitted by the opto-electronic device 20.

In other words, the applicator device 12 (and, consequently, the nozzle 18) is interposed between the opto-electronic device 4* and the opto-electronic device 20.

The optoelectronic device 20 comprises an optical profilometer 21. The optical profilometer 21 in turn comprises a light emitting device 22 configured in such a way as to emit/generate the light beam LB. The light beam LB is collimated onto a plane so that it is laminar and divergent, in such a way as to form a spectrum of light that traces the line of light over the affected surface 5. According to a preferred variant, the spectrum of light impacts a portion of the surface 5 to which the sealing agent is to be subsequently applied. It is beneficial to point out that the light beam LB** impacts upon only a portion of the cross-section of the surface 5 upon which the sealing agent has been applied. The light emitting device 22 comprises a source 23 of laser light.

The optical profilometer 21 furthermore comprises a sensor element 24 configured in such a way as to acquire/capture the image contained within the line of light projected onto the impacted surface 5 and to supply a signal that is indicative of the captured image. Conveniently, the sensor element 24 can comprise an image acquisition device, for example a micro-camera.

The system 1 furthermore comprises an electronic processing system 11 that is configured to receive from both the opto-optoelectronic device 4* and the opto-optoelectronic device 20 (namely from the respective sensor elements indicated with 9* and 24) the signals that are indicative of captured images.

With particular reference to the opto-electronic device 4*, the electronic processing system 11 is configured in such a way as to process the signal that is indicative of each captured image in order to determine the profile of the corresponding portion of the surface 5 as a function of the line of light contained within said image. Conveniently, the electronic processing system 11 is configured in such a way as to determine the profile of each portion of the surface 5 in implementing a PA algorithm that digitally processes the corresponding captured image. The maximum measurable dimensions are in the order of one millimeter.

Once the profile of the corresponding portion of the surface 5 has been determined, the processing PA algorithm is able to control the open loop application of the sealing agent. In particular, the processing PA algorithm is able to calculate the movement of the sealing agent application nozzle 18 as a function of said profile. The electronic processing system 11 is configured in such a way as to drive the arm 13 as a function of the acquired profile of the portion of the surface 5. In particular, the electronic processing system 11 is configured in such a way as to drive the arm 13 so as to vary the distance of the nozzle 18 from the surface 5 and hold the distance between the nozzle 18 and the surface 5 substantially constant.

With particular reference to the opto-electronic device 20, the electronic processing system 11 is in contrast configured in such a way as to process the signal that is indicative of each captured image with the aim of verifying the application of the sealing agent onto the corresponding portion of the surface 5 as a function of the line of light contained within said image.

Conveniently, the electronic processing system 11 is configured in such a way as to determine the profile of each portion of the surface 5 after the application of the sealing agent in implementing a PA algorithm that digitally processes the corresponding captured image. The maximum measurable dimensions are in the order of one millimeter.

Once the profile of each portion of the surface 5 has been determined, after the application of the sealing agent, the processing PA algorithm is able to control the open loop application of the sealing agent. In particular, the processing PA algorithm is able to correct any variations in the application of the sealing agent as a function of the profile of each portion of the surface 5 after the application of the sealing agent. Advantageously, in order to correct any variations in the application of the sealing agent, the processing PA algorithm is able to intervene on the circuit 14 supplying the sealing agent.

In the event that very rapid fluctuations/periodic variations are detected (fluctuations of a limited period), the processing PA algorithm is configured so as to drive the arm 13 in such a way as to vary/adjust the distance of the nozzle 18 from the surface 5; preferably, the processing PA algorithm is configured in order to hold the distance between the nozzle 18 and surface 5 substantially constant.

If by contrast somewhat slow fluctuations/periodic variations are detected (fluctuations of a prolonged period), the processing PA algorithm is able to modify the parameters of the supply process and extrusion of the sealing agent (intervening in the flow rate and sealing agent extrusion rate).

Conveniently, the electronic processing system 11 may comprise an operator interface 19, such as a control panel and/or a display or similar, by means of which the operator can control the internal cavity 2 profile scanning process and the application of the sealing agent.

Hereinafter there will be described the method of operation of the system 1, which includes, in succession, the following steps:

- an operator or alternatively an automatic handler arranges the pneumatic tyre 3 on the support and blocks it by means of the side rails in such a way as to prevent any lateral translation of the pneumatic tyre 3 itself;
- in response to an operator command given, for example, through the operator interface 19, the arm 13 is inserted into the internal cavity 2;
- the pneumatic tyre 3 is brought into rotation by the support around the x-axis;
- by means of the emitter device 7 the opto-electronic unit 4* emits the light beam LB* so as to project the line of light onto the surface 5 and to collect, by means of the sensor element 9, the reflected image containing the corresponding projected line of light;
- the opto-electronic device 4* transfers each acquired image in digital format, in the form of data or else encoded as electrical signals, to the electronic processing system 11;
- the electronic processing system 11, by means of the PA algorithm that digitally processes the acquired images determines the profile of each portion of the surface 5 and calculates the movement of the sealing agent application nozzle 18 as a function of said profile;*
- the nozzle 18 implements the application of the sealing agent;
- by means of the emitter device 22 the opto-electronic unit 20 emits the light beam LB** so as to project the line of light onto the surface 5 and to collect, by means of the sensor element 24, the reflected image containing the corresponding projected line of light;
- the opto-electronic device 20 transfers each acquired image in digital format, in the form of data or else encoded as electrical signals, to the electronic processing system 11;
- the electronic processing system 11, by means of the PA algorithm that digitally processes the acquired images determines the profile of each portion of the surface 5 after the application of the sealing agent and corrects any variations in application of the sealing agent as a function of said profile of each portion of the surface 5 after the application of the sealing agent.

A third variant (not shown) of the system 1 is provided, which is configured in such a way as to determine the profile of the internal cavity 2 of a pneumatic tyre 3 and, subsequently, for the application of a sealing agent to the surface 5 of said internal cavity 2. The third variant provides for the use of an opto-electronic device 4 of the type described in the preceding discussion, housed within the movable external enclosure so that it can be moved and arranged in a detection position within the internal cavity 2 directly facing the surface 5. The opto-electronic device 4 is connected to the electronic processing system 11 in order to perform the three dimensional scan of each portion of the surface 5 and to acquire the profile of the entire internal cavity 2. The third variant furthermore provides for the use of the sealing agent applicator device 12 which is conveniently implemented by means of a robot with an arm 13 that is movable and provided with a nozzle 18 intended to apply a substantially uniform bead of sealing agent to the surface 5. Housed within the arm 13 are both the opto-electronic device 4* arranged immediately upstream in relation to the nozzle 18, so that each portion of the surface 5 to be coated with the sealing agent is firstly impacted by the light beam LB* emitted by the opto-electronic device 4* and then by the bead of sealing agent emitted from the nozzle 18, and the opto-electronic device arranged immediately downstream in relation to the nozzle 18, so that each portion of the surface 5 is both firstly coated with the bead of sealing agent emitted from the nozzle 18 and then impacted by the light beam LB** emitted by the opto-electronic device 4*. The variant just described therefore provides for the use of three optical profilometers 6, 6* and 21.

Once the profile of the entire internal cavity 2 has been determined by means of the opto-electronic device 4, the electronic processing system 11 is then able to control both the open loop application of the sealing agent by means of the opto-electronic device 4* and the closed loop application of the sealing agent in order to correct any variations in the application of said sealing agent by means of the opto-electronic device 20.

The advantages of the different systems 1 described in the preceding discussion are evident.

In particular, the use of the opto-electronic devices, 4, 4* and 20 with the respective optical profilometers 6, 6* and 21 makes it possible to perform a very uniform application (in terms of the thickness and width of the bead and in terms of the accuracy of the sealing agent area of application) of the sealing agent on the surface 5 insofar as they take into account the actual profile of the internal cavity 2 of the pneumatic tyre 3, i.e., they take into consideration any differences that may exist following the process of vulcanizing the pneumatic tyre 3, such as bumps and protrusions and those generated during the handling of the pneumatic tyre 3 (specifically, the lateral blocking of the support and the rotation imparted by the support by means of the motorized rollers) in addition to those variations generated by fluctuations in the flow of the sealing agent within the supply circuit.

In other words, internally, pneumatic tyres have measurable and significant deformities in relation to tolerances due to the presence of bumps and protrusions that can inevitably be created especially during the vulcanization process. Furthermore, the pneumatic tyre handling steps (in particular, the lateral blocking of the support and the rotation imparted by the support using the motorized rollers) also cause the profiles of the internal cavities of pneumatic tyres that are being processed to deviate from the profiles of the reference pneumatic tyre. Applying the sealing without taking into consideration the actual profile of the internal cavity of the pneumatic tyres determines a marked lack of homogeneity regarding the thickness of the sealing agent.

Furthermore, fluctuations in the flow of the sealing agent that are generated within the supply circuit often result in variations in the thickness and width of the bead of sealing agent that is applied to the internal cavity of the pneumatic tyre; consequently, applying the sealing agent without taking into consideration fluctuations in the flow of the sealing agent that are generated within the supply circuit determines a certain lack of homogeneity regarding the thickness of the sealing agent.

The invention claimed is:

1. System for applying a sealing agent to the surface (5) of an internal cavity of a pneumatic tire; the system comprises:

an applicator device, that is provided with a nozzle and that is suitable for supplying a strip of sealing agent that is applied to the surface;

a first opto-electronic device that is integral to and arranged upstream of the nozzle and provided with a first sensor element configured to acquire a first plurality of images of the surface that is devoid of the sealing agent;

a second opto-electronic device that is integral to and arranged downstream of the nozzle and provided with a second sensor element configured to acquire a second plurality of images of the surface provided with the sealing agent;

a third opto-electronic device provided with a third sensor element that is able to acquire a third plurality of images of the entire surface and to provide a plurality of signals that are indicative of said third plurality of acquired images; and an electronic processing system, which is connected to the first, second, and third opto-electronic devices and to the applicator device and that is configured in such a way as to:

control an open loop application of the sealing agent as a function of a first plurality of signals that are indicative of the first plurality of images captured by the first opto-electronic device;

control a closed loop application of the sealing agent as a function of a second plurality of signals that are indicative of the second plurality of images captured by the second opto-electronic device; and process the signals that are indicative of the third plurality of acquired images to determine the surface profile of the entire internal cavity and in such a way as to drive the applicator device as a function of the surface profile of the entire internal cavity.

2. System according to claim 1, wherein the first opto-electronic device comprises, in turn, at least one respective optical profilometer provided with a light emitting device configured so as to generate a respective light beam that impacts the surface so as to project a line of light onto said surface; wherein each sensor element is configured in such a way as to capture the image containing the line of light projected onto the surface by the respective light emitting device.

3. System according to claim 2, wherein the light emitting device is implemented by means of a source of laser light.

4. System according to claim 2, wherein the light beam is collimated onto a plane in such a way as to form a spectrum of light that traces a line of light over the impacted surface.

5. System according to claim 4, wherein the light beam impacts upon only a portion of the cross-section of the surface upon which the sealing agent is to be applied.

6. System according to claim 1, wherein the nozzle of the applicator device is arranged at a certain distance from the surface in order to perform a non-contact application of the sealing agent in the semifluid state.

7. System according to claim 6, wherein the sealing agent applicator device comprises a movable arm that supports, at an end thereof, the nozzle and the first and second opto-electronic devices.

8. System according to claim 1, wherein the third opto-electronic device comprises, in turn, at least a third optical profilometer provided with a third light emitting device configured so as to generate a light beam that impacts the surface so as to project a line of light onto said surface and implemented by means of a source of laser light; wherein the third sensor element is configured in such a way as to acquire the image containing the line of light projected onto the surface by the respective third light emitting device.

9. System according to claim 8, wherein the light beam generated by the third light emitting device is collimated onto a plane in such a way as to form a spectrum of light that traces a line of light over the impacted surface and impacts a portion of the surface that substantially corresponds to the transverse portion of the surface upon which the sealing agent is to be applied.

\* \* \* \* \*